United States Patent
Hoga et al.

(10) Patent No.: US 11,878,539 B2
(45) Date of Patent: Jan. 23, 2024

(54) CONTROL SYSTEM (71) Applicant: BROTHER KOGYO KABUSHIKI KAISHA, Nagoya (JP)

(72) Inventors: Masahiro Hoga, Ogaki (JP); Shohei Ichikawa, Niwa (JP); Satoru Arakane, Nagoya (JP); Eisuke Takahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/690,291

(22) Filed: Mar. 9, 2022

(65) Prior Publication Data
US 2022/0314671 A1    Oct. 6, 2022

(30) Foreign Application Priority Data

Mar. 30, 2021   (JP) ................. 2021-058136

(51) Int. Cl.
*B41J 29/387*    (2006.01)
*H02K 11/25*     (2016.01)
*B41J 29/393*    (2006.01)

(52) U.S. Cl.
CPC .......... *B41J 29/387* (2013.01); *B41J 29/393* (2013.01); *H02K 11/25* (2016.01); *B41J 2203/00* (2020.08)

(58) Field of Classification Search
None
See application file for complete search history.

(56) References Cited

U.S. PATENT DOCUMENTS

2008/0291231 A1* 11/2008 Yun .................. B41J 29/38
                                                318/473

FOREIGN PATENT DOCUMENTS

| JP | 2005-022115 A | 1/2005 |
| JP | 2014-226818 A | 12/2014 |
| JP | 2019-072910 A | 5/2019 |

* cited by examiner

*Primary Examiner* — Erica S Lin
(74) *Attorney, Agent, or Firm* — Scully, Scott, Murphy & Presser, P.C.

(57) ABSTRACT

A control system is configured such that a carriage that a processing head is mounted is driven by a motor and reciprocates. The motor is controlled by a controller. The controller reciprocates the carriage by selecting a control mode as a target mode based on temperature information related to temperature of the motor and controlling the motor in the target mode. The controller selects the target mode to be applied to the control of the motor for each of particular work units. The target mode is selected from a group of particular control modes. Each control mode in the group of particular control modes is a control mode in which a maximum temperature, which is estimated based on the temperature information, when the control of the motor using the selected control mode would be executed until the processing is completed, is less than a reference value.

15 Claims, 9 Drawing Sheets

FIG. 10

CONTROL SYSTEM

CROSS REFERENCE TO RELATED APPLICATIONS

This application claims priority under 35 U.S.C. § 119 from Japanese Patent Application No. 2021-058136 filed on Mar. 30, 2021. The entire subject matter of the application is incorporated herein by reference.

BACKGROUND

The present disclosures relate to a control system.

There has been known an inkjet printer in which a temperature of a motor for driving a carriage is estimated, and the motor is temporarily stopped when the estimated temperature is equal to or greater than a threshold value. There has been known another type of inkjet printer which is configured that a moving speed of a carriage mounting an inkjet head is raised in a non-imaging area sandwiched between image areas in order to speed up an imaging process.

SUMMARY

However, in a control system, in which an object is processed with moving a carriage mounting a processing head, when a moving speed of the carriage is increased in a non-processing area, a temperature of a motor that drives the carriage is likely to be raised in comparison with a case where the moving speed is not increased.

When the temperature of the motor exceeds an allowable range, it becomes necessary to pause the motor. If a high-temperature state of the motor is maintained without pausing the motor, the life of the system will be shortened. On the other hand, if the motor is paused in the middle of processing the object, it may cause an undesirable effect on the processing result.

For example, in an inkjet printer, ink droplets are ejected multiple times in the same area of a sheet by an interlace control, and an image is formed by the superimposition of such droplets. According to such an image formation with the interlace control, if the operation is paused during the superimposing process, a drying period of the ink ejected onto the sheet is elongated. Then, a visually recognizable change in the quality of the image is formed on the sheet compared to a case without the pause. Not only in inkjet printers, but also in systems that process objects using liquid droplets, the drying time and reaction time of the droplets can affect the processing quality.

According to aspects of the present disclosure, there is provided a control system, including a motor, a carriage configured to be driven by the motor to reciprocate, a processing head mounted on the carriage and configured to eject liquid droplets to a target object when the carriage moves along a moving passage of the carriage, and a controller configured to control the motor. The controller can perform obtaining temperature information related to a temperature of the motor, selecting one of multiple control modes, based on the temperature information, as a target mode, and causing the carriage to reciprocate by controlling the motor in accordance with the target mode. The multiple control modes are control modes defining target acceleration movements are different from each other, each of the target acceleration movements being a movement from a time when the carriage starts moving to a time when the carriage stops at a turnaround point of reciprocating movement of the carriage. The selecting one of multiple control modes includes, for each of particular work units related to processing of the target object, selecting a target mode to be applied to the control of the motor for the processing of the corresponding work unit. The target mode is selected from a group of particular control modes among the multiple control modes, each control mode in the group of particular control modes being a control mode in which a maximum temperature of the motor, in a case where the control of the motor using the selected control mode is executed until the processing of the corresponding work unit is completed, is less than a reference value, the maximum temperature of the motor being a temperature estimated based on the temperature information.

DETAILED DESCRIPTION OF THE EMBODIMENTS

Hereinafter, an embodiment and modification according to the present disclosures will be described with reference to the accompanying drawings.

Figure 1:
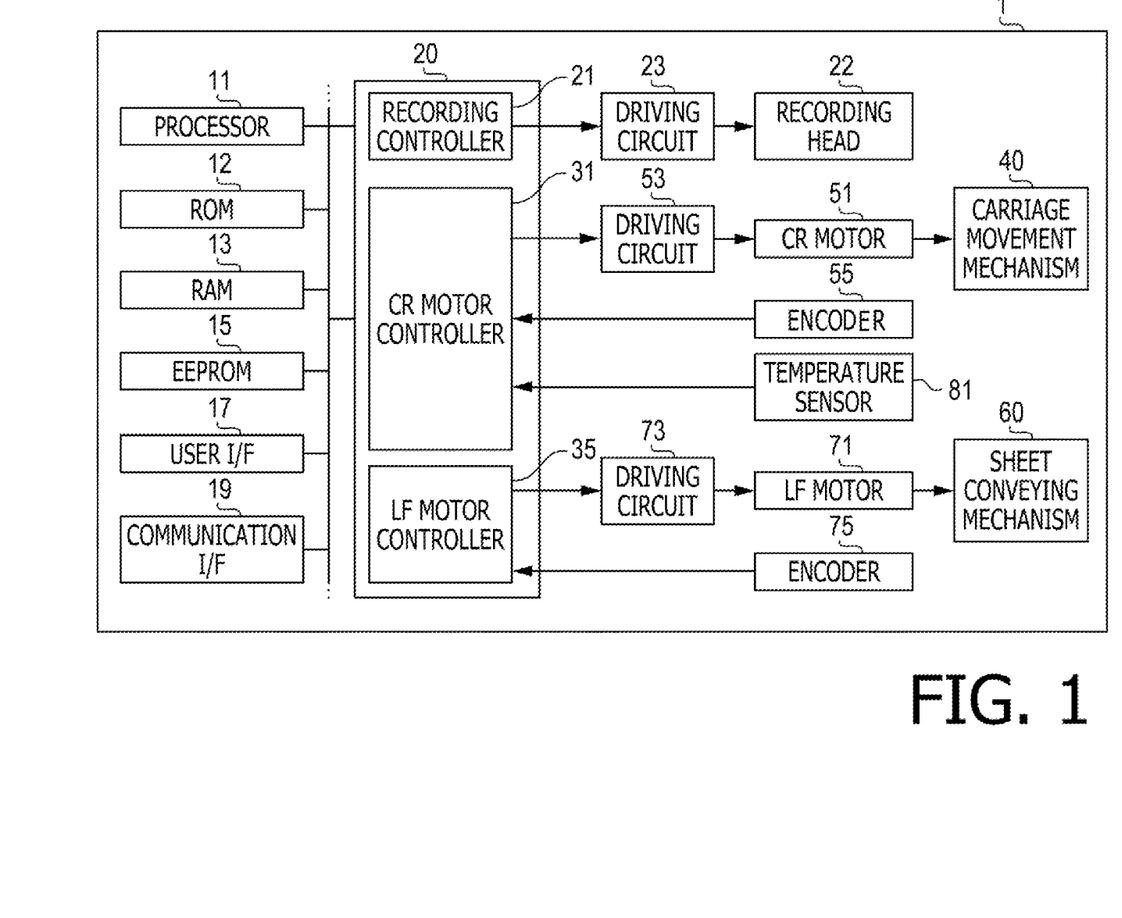
FIG. 1 is a block diagram showing a configuration of an image forming system.

FIG. 1 shows a block diagram of an image forming system 1, which is an inkjet printer configured to form an image on a sheet P, which is a processing object, by ejecting ink droplets. The image forming system 1 includes a processor 11, a ROM 12, a RAM 13, an EEPROM 15, a user interface 17, a communication interface 19, and an ASIC 20. The ASIC 20 is provided with a recording controller 21, a CR (carriage) motor controller 31, and an LF (linefeed) motor controller 35.

The image forming system 1 is further provided with, for a configuration to form an image on the sheet P, a recording head 22 and a drive circuit 23. The image forming system 1 is further provided with, for a configuration to move the recording head 22 in a main scanning direction, a carriage conveying mechanism 40, a CR motor 51, a driving circuit 53, and an encoder 55. The carriage conveying mechanism 40 includes a carriage 41 mounting the recording head 22.

The image forming system 1 is also provided with, for a configuration to convey the sheet P in an auxiliary scanning direction, which is orthogonal to the main scanning direction, a sheet conveying mechanism 60, an LF motor 71, a drive circuit 74 and an encoder 75. The image forming system 1 is further includes a temperature sensor 81 configured to measure a temperature of the CR motor 51.

The processor 11 integrally controls the image forming system 1 to realize various functions by performing processes in accordance with computer programs stored in the ROM 12. In the ROM 12, various computer programs are stored. The RAM 13 is used as a work memory when the processor 11 performs various processes. The EEPROM 15 is an electrically rewritable non-volatile memory and various setting information are stored therein.

The user interface 16 has an operation panel configured to be operable by the user, and a display configured to display various information to the user. The communication interface 19 is configured to be communicable with an external device such as a personal computer.

Figure 2A:
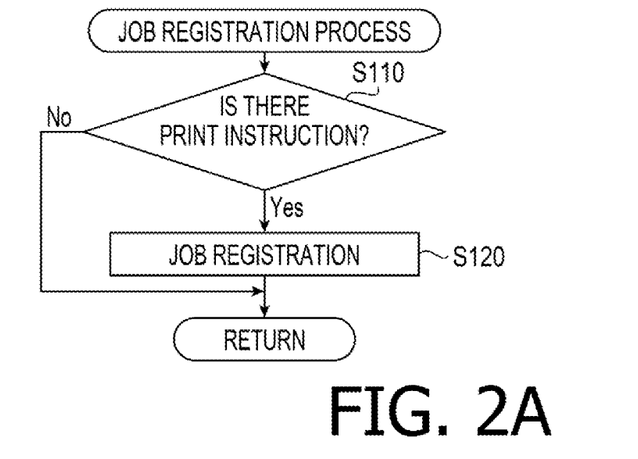
FIG. 2A is a flowchart illustrating a job registration process.

By repeatedly performing the job registration process shown in FIG. 2A, every time when the processor 11 receives a print instruction from the external device (S110: YES), the processor 11 registers a corresponding pint job with a queue (S120). At this time, the processor 11 temporarily stores print object data received together with the print instruction in the RAM 13. The print object data is data to be printed on the sheet P in the printing process corresponding to the print job. The print instruction corresponding to print registration and print instruction.

Figure 2B:
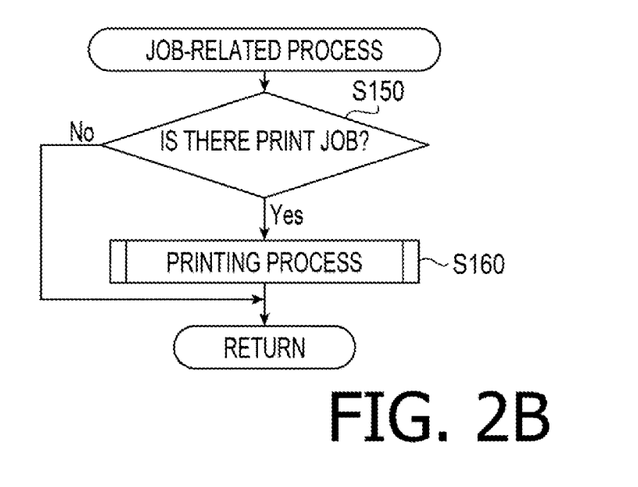
FIG. 2B is a flowchart illustrating a job-related process.

By repeatedly executing a job-related process shown in FIG. 2B, in parallel with the job registration process, when unprocessed print job is stored in the queue (S150: YES), the processor 11 selects one of the unprocessed print jobs as a target process, and performs the printing process corresponding to the selected print job (S160).

In the printing process (S160), the processor 11 causes the recording controller to execute an ejection control of the ink droplets from the recording head 22, the CR motor controller 31 to control the CR motor 51 to execute a movement control of the carriage 41, and the LF motor controller 35 to control the LF motor 71 to execute a conveyance control of the sheet P. According to the above controls, an image is formed on the sheet P based on the print object data which is received at the time of registration of the corresponding print job.

The recording head 22 (see FIG. 1) is a processing head to process, by printing, the sheet P. Concretely, the recording head 22 is an inkjet head formed with a plurality of nozzle arrays for ejecting the ink droplets. The recording head 22 is driven by the drive circuit 23 to eject the ink droplets on the sheet P facing the recording head 22 on a moving passage of the carriage 41, thereby processing the sheet P (i.e., performing print processing).

The recording controller 21 is configured to, in accordance with instructions by the processor 11, input a driving signal into the drive circuit 23 so that an image based on the print object data is formed on the sheet P, and control the ejection operation of the ink droplets by the recording head 22.

Figure 4:
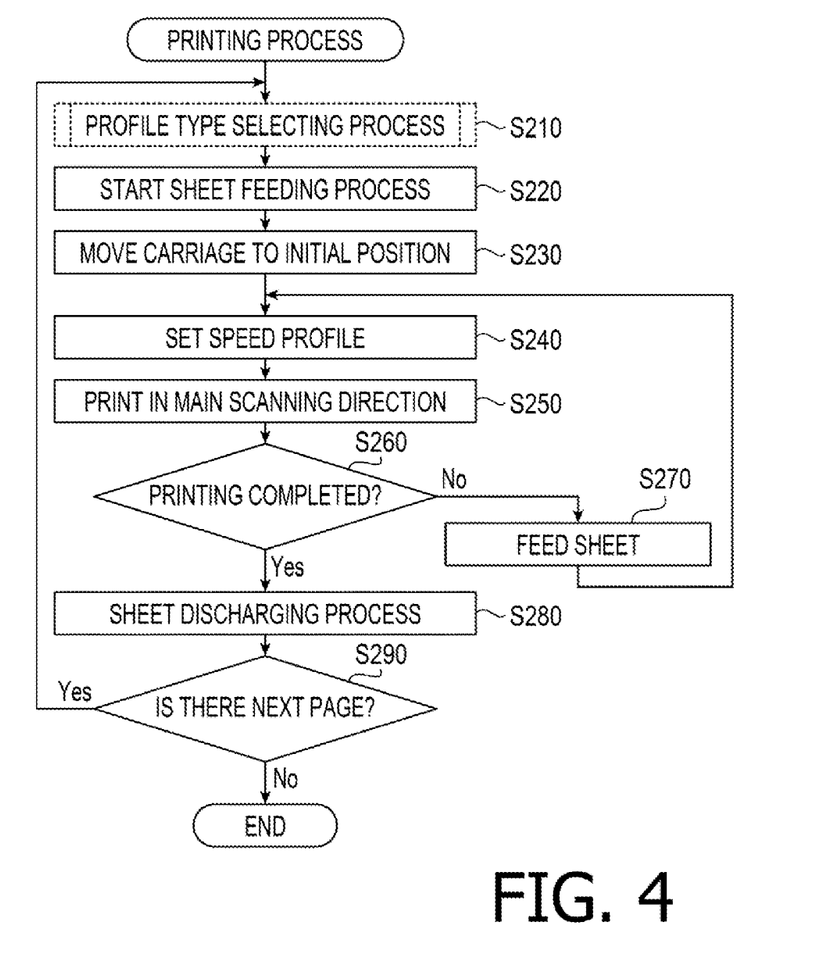
FIG. 4 is a flowchart illustrating a printing process.

The carriage conveying mechanism 40 is provided with, as shown in FIG. 4, the carriage 41 mounting the recording head 22, a guide rail 42, and a belt mechanism 43. The carriage conveying mechanism 40 is configured to be driven by the CR motor 51 to reciprocate the carriage 41 in the main scanning direction.

The guide rail 42 is configured to limit the moving direction of the carriage 41 to the main scanning direction. The belt mechanism 43 is provided with a driving pulley 431 and a driven pulley 433, and a belt 435 wound between the driving pulley 431 and the driven pulley 433. The carriage 41 is fixedly secured to the belt 435.

The belt mechanism 43 is configured such that the driving pulley 431 receives a driving force from the CR motor 51 to rotate, and the belt 435 and the driven pulley 433 are driven to rotate in accordance with the rotation of the driving pulley 431. As the belt 435 rotates (moves around the driving pulley 431 and the driven pulley 433), the carriage 41 moves in the main scanning direction as guided along the guide rail 42.

The CR motor 51 is, for example, a DC motor and driven by the driving circuit 53. The driving circuit 53 applies a driving voltage to the CR motor 51 in accordance with the control signal input from the CR motor controller 31 to drive the CR motor 51.

The CR motor controller 31 operates in accordance with instructions from the processor 11, and controls the CR motor 51 so that the carriage 41 moves in the main scanning direction at a speed following a speed profile designated by the processor 11. In this case, the CR motor controller 31 executes a feedback control to control a moving speed of the carriage 41 based on an encoder signal input from the encoder 55.

The encoder 55 is configured, for example, as a linear encoder. The linear encoder includes an encoder scale (not shown) provided along the guide rail 42 and an optical sensor (not shown) mounted on the carriage 41 to detect the encoder scale.

The encoder 55 outputs a pulse signal corresponding to a displacement, in the main scanning direction, of the carriage 41 as the encoder signal. The CR motor controller 31 measures (detects) the position, in the main scanning direction, and the moving speed of the carriage based on the encoder signal, and control the CR motor 51, thereby controlling the movement of the carriage 41 in the main scanning direction.

Figure 3:
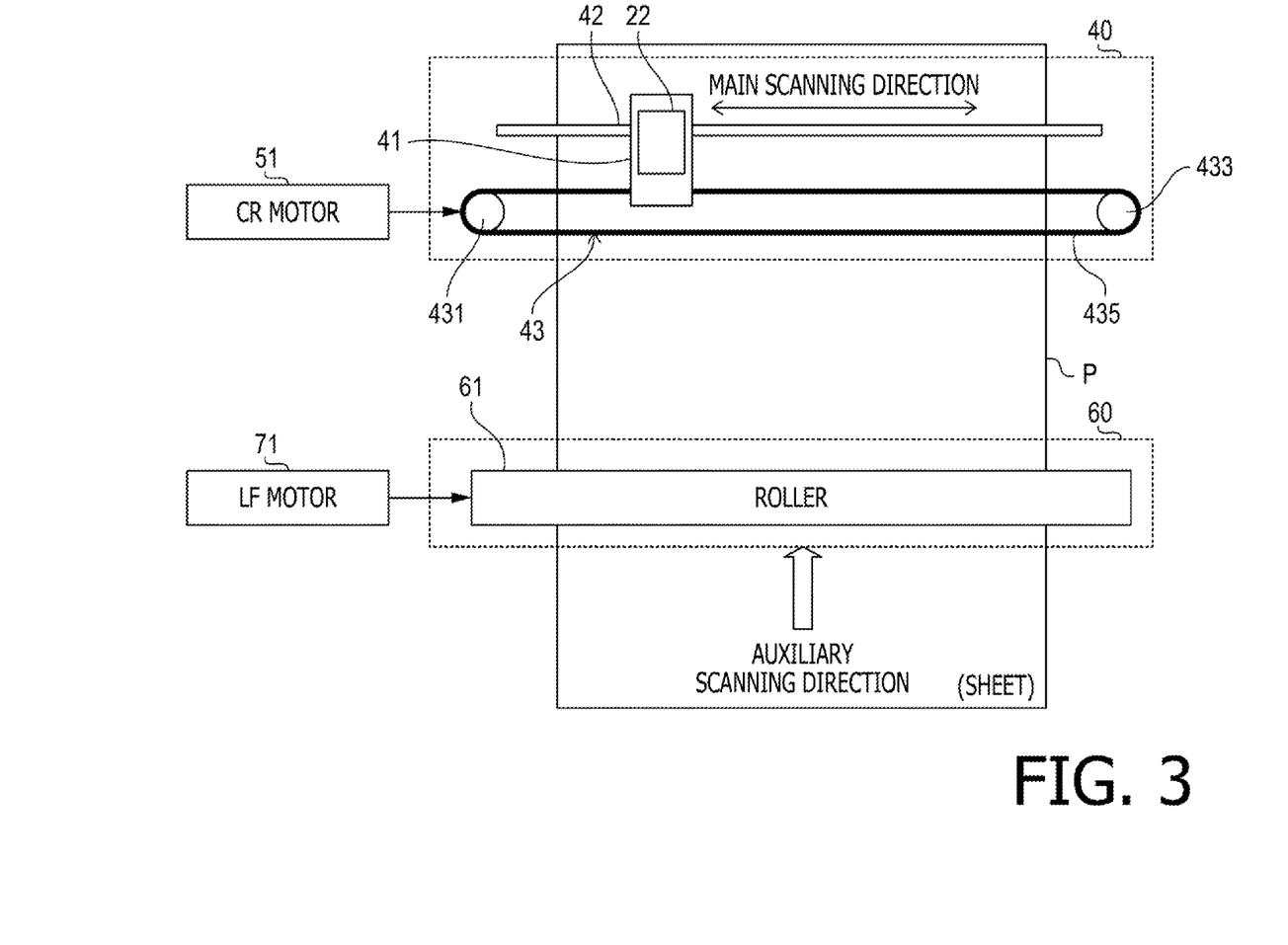
FIG. 3 schematically illustrates a carriage conveying mechanism and a sheet conveying mechanism.

The sheet conveying mechanism 60 has a roller 61 (see FIG. 3) which is a cylindrical rotatable member, of which a rotation axis extends in the main scanning direction, and is configured to be driven by the LF motor 71 to convey the sheet P in the auxiliary scanning direction. The sheet conveying mechanism 60 conveys the sheet P fed from a tray one by one in the auxiliary scanning direction by the rotation of the roller 61 toward an ink ejection position of the recording head 22.

The LF motor 71 is, for example, a DC motor and configured to be driven by the driving circuit 73. The driving circuit 73 is configured to drive the LF motor 71 in accordance with the control signal input from the LF motor controller 35.

The LF motor controller 35 is configured to generate the control signal for the driving circuit 73 in accordance with the instruction from the processor 11 to control the LF motor 71. The LF motor controller 35 executes a conveyance control of the sheet P by means of the feedback control based on output signals of the encoder 75, which is, for example, a rotary encoder provided to the LF motor 71, the roller 61, or a transmission system therebetween.

Next, the printing process which the processor 11 performs in S160 will be described referring to FIG. 4. In the printing process, an image based on the print object data which is received when a print job is registered is formed on the sheet P. when the print object data contains page image data for multiple pages, for each page, a page image based on the corresponding page image data is formed on one sheet P corresponding to one page.

When the printing process is started, the processor 11 executes a profile type selecting process in S120, and then, executes a page printing process (S220-S280) which is an image forming process for each page.

Figure 7:
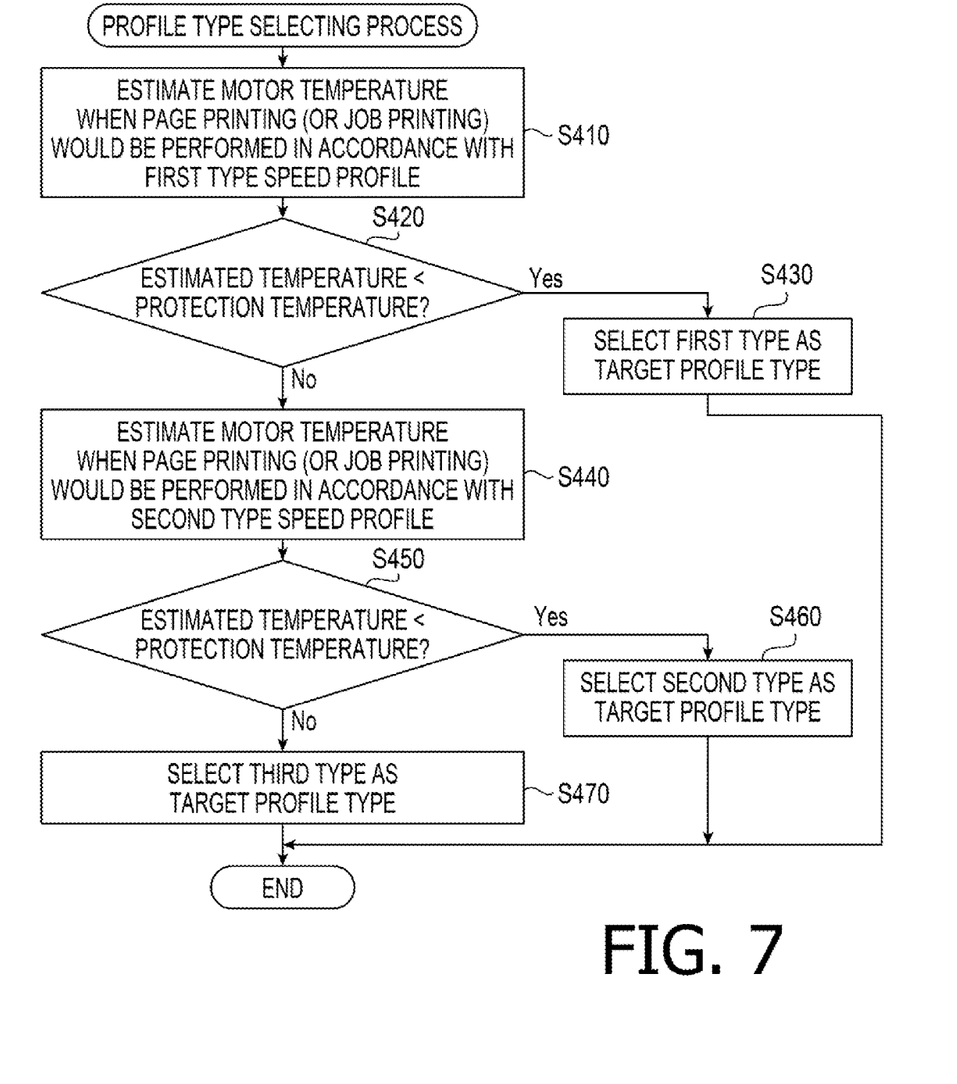
FIG. 7 is a flowchart illustrating a profile type selecting process.

In S210, by executing the profile type selecting process shown in FIG. 7, the processor 11 selects a target profile type which is a type of a speed profile to be used for the speed control of the carriage 41 in the page printing process (S220-280). In S210, the processor 11 selects the target profile type with referring to the page image data corresponding to the page image to be formed on the sheet P and subjected to be processed.

Figure 5A:
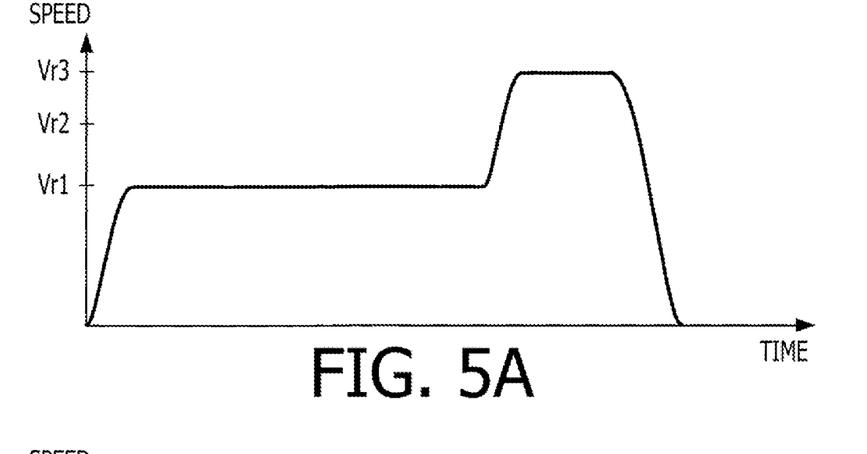
FIG. 5A shows a first-type speed profile.
Figure 5B:
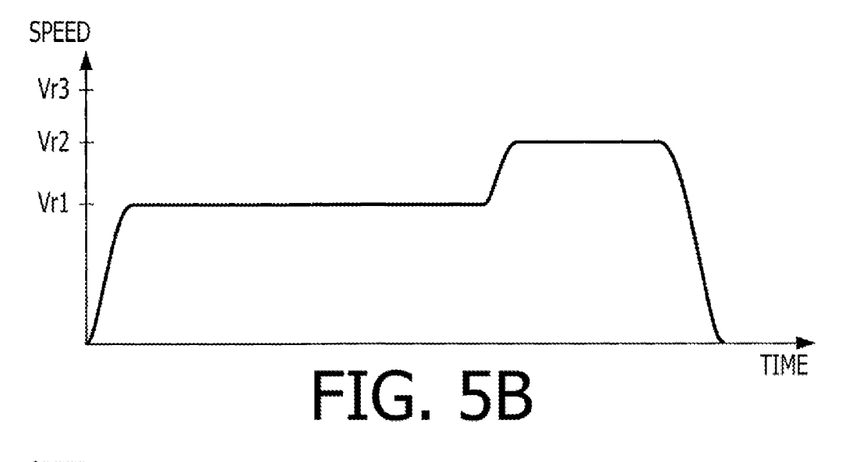
FIG. 5B shows a second-type speed profile.
Figure 5C:
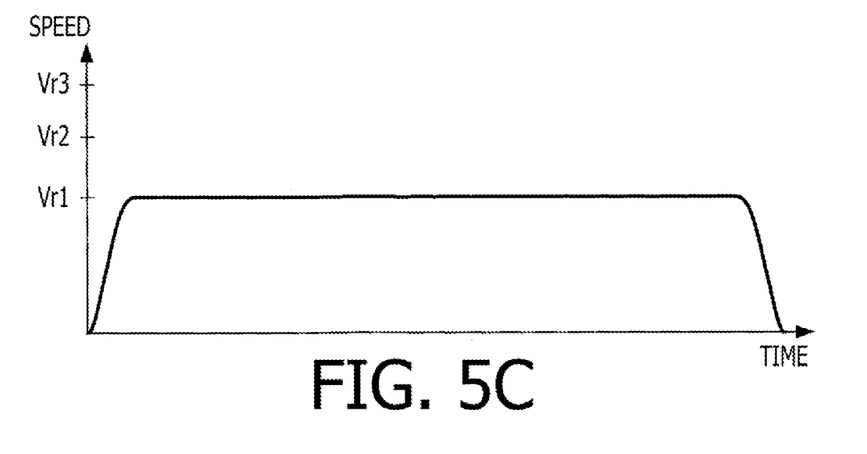
FIG. 5C shows a third-type speed profile.

The processor 11 selects the speed profile type representing the shortest moving time of the carriage 41 from among the three types of speed profiles shown in FIGS. 5A-5C, taking a temperature rise of the CR motor 51 into consideration, within a range where the temperature of the CR motor 51 does not become equal to or greater than a protection temperature. The protection temperature is defined in this embodiment as a temperature at which the CR motor 51 needs to be protected from a damage due to high temperature by stop driving the CR motor 51.

When the page image is to be formed on the sheet P, the CR motor 51 such that the carriage 41 reciprocates under the control of the CR motor controller 31. When the carriage 41 moves from a turnaround position to another turnaround position, the CR motor 51 is controlled such that the carriage 41 moves at the speed in accordance with the speed profile.

The speed profile defines a target speed Vr at every point of time in a process where the carriage 41 starts moving from a movement start position corresponding to the turnaround position to a target stop position corresponding to the other turnaround position. Within a range from the movement start position to the target stop position, an ink ejection section in which the ink droplets are ejected from the recording head 22 is included.

For the ink ejection section, a first speed Vr1 which is preliminarily defined to form an image having an excellent quality on the sheet P is set as the target speed VR, and the CR motor 51 is controlled so that the carriage 41 moves at the first speed Vr1.

Three types of the speed profiles respectively shown in FIGS. 5A-5C are defined such that the target speeds Vr in the non-ink ejection sections are different from each other. Concretely, the three types of the speed profiles include a type in which the target speed Vr in the non-ink ejection section is a first speed Vr1, a type in which the target speed Vr in the non-ink ejection section is a second speed Vr2 which is faster than the first speed Vr1, and a type in which the target speed Vr in the non-ink ejection section is a third speed Vr2 which is faster than the second speed Vr2.

FIG. 5A shows a first type speed profile, which has following features.

The profile includes an acceleration section where the carriage 41 is accelerated from the stopped state (i.e., when located at the movement start position) to the first speed Vr1. The end point of the acceleration section is before the start point of the ink ejection section.

The profile includes a constant speed section where the carriage 41 is driven to move at a constant speed (i.e., the first speed Vr1). The constant speed section is a section from the end point of the acceleration section to an end point of the ink ejection section.

The profile includes a re-acceleration section where the carriage 41 is accelerated from the first speed Vr1 to a third speed Vr3.

The profile includes a high-speed section where the carriage 41 is driven to move at a third speed Vr3, which is a constant speed. The third section starts at an end point of the re-acceleration section where the moving speed of the carriage 41 has reached the third speed Vr3 to a deceleration start point which is before the target stop position by a particular amount necessary for deceleration of the carriage 41.

The profile includes a deceleration section where the carriage 41 is decelerated toward the target stop position and then stopped at the target stop position. The deceleration starts immediately after the carriage 41 has reached the deceleration start point.

FIG. 5B shows a second type speed profile which has generally the same shape as the first type speed profile. The second type speed profile adopts, instead of the third speed Vr3 of the first type speed profile, a second speed Vr2 which is slower than the third speed Vr3. In other words, the second type speed profile is the speed profile where the target speed Vr in the high-speed section is the second speed Vr2, which is slower than the third speed Vr3.

FIG. 5C shows a third type speed profile, which has following features.

The profile includes an acceleration section where the carriage 41 is accelerated from the stopped state (i.e., when located at the movement start position) to the first speed Vr1. The end point of the acceleration section is before the start point of the ink ejection section.

The profile includes a constant speed section where the carriage 41 is driven to move at a constant speed (i.e., the first speed Vr1). The constant speed section is a section from the end point of the acceleration section, passing the ink ejection section, to a deceleration start point which is before the target stop position by a particular amount necessary for deceleration of the carriage 41.

The profile includes a deceleration section where the carriage 41 is decelerated toward the target stop position and then stopped at the target stop position. The deceleration starts immediately after the carriage 41 has reached the deceleration start point.

As described above, the three types of the speed profiles are different from each other in terms of the target speed Vr and the changing characteristics thereof in the non-ink ejection section in an intermediate section between the acceleration section and the deceleration sections. When the target profile type is selected in S210, the processor 11 starts the sheet feeding process in S220.

In the sheet feeding process, the processor 11 causes the LF motor controller 35 to control the LF motor 71 so that one of the sheets P accommodated in a sheet tray (not shown) is picked up (i.e., separated from the other) and conveyed in the auxiliary scanning direction to the ejection position of the ink droplets of the recording head 22. At this stage, the processor 11 also causes the CR motor controller 31 to control the CR motor 51 to move the carriage 41 located at a home position to an initial position (S230). The home position is a position of the carriage 41 when the image forming system 1 is in a standby state. The initial position is the movement start position.

Thereafter, the processor 11 sets the speed profile defining the target speed Vr of the carriage 41 from the movement start position to the target stop position to the CR motor controller 31 (S240). The speed profile set to the CR motor controller 31 is the speed profile of the target profile type selected in the profile selecting process described above.

Figure 6:
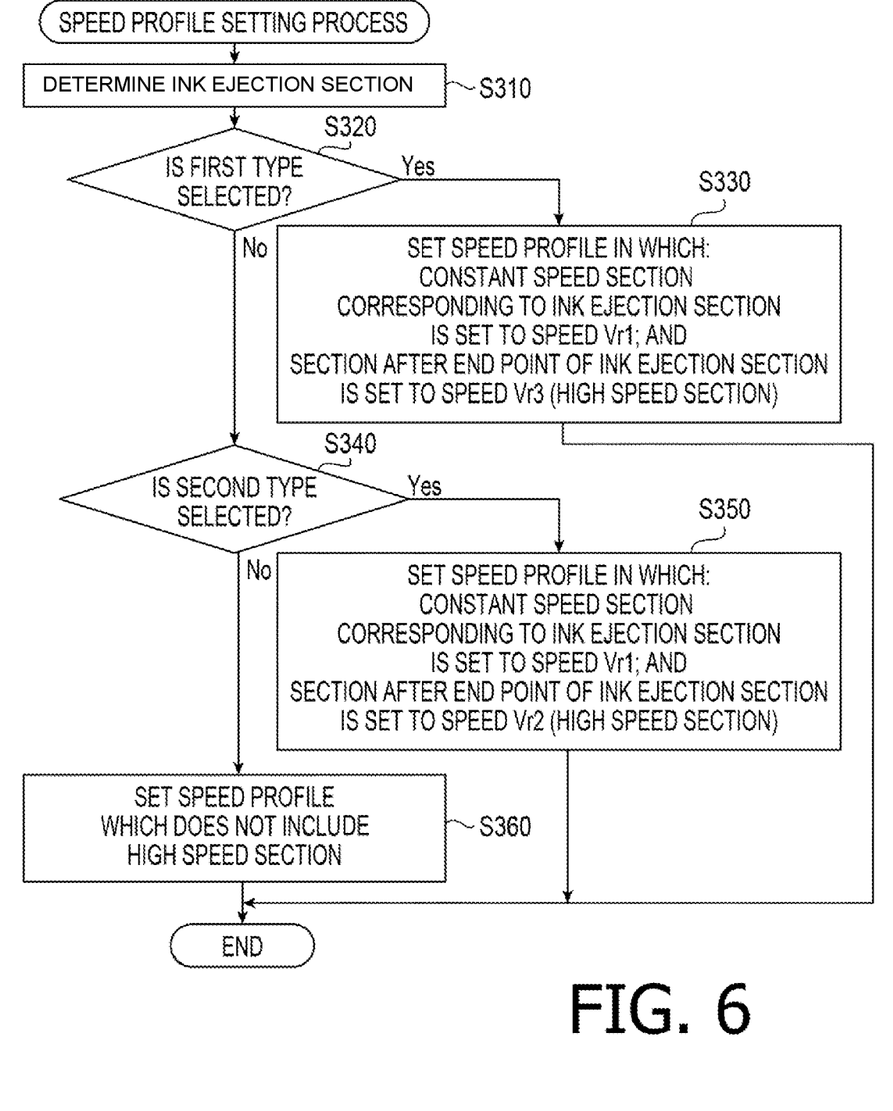
FIG. 6 is a flowchart illustrating a speed profile setting process.

In S240, the processor 11 can execute the speed profile setting process shown in FIG. 6 to set the speed profile corresponding to the ink ejection section. When the speed profile setting process is started, the processor 11 determines the ink ejection section (S310) at which the ejection operation of the ink droplets by the recording head 22 within the moving passage of the carriage 41 from the movement start position to the target stop position in the next printing in the main scanning direction (hereinafter, "printing in the main scanning direction" will be referred to as "main scanning direction printing") (S250).

The processor 11 then determines whether the target profile type selected in the profile selecting process is of the first type (S320). When it is determined that the target profile type is of the first type (S320: YES), the processor 11 executes a process of S330.

In S330, the processor 11 generates a speed profile defining the target speed Vr such that: the carriage 41 is accelerated so that the moving speed of the carriage 41 reaches the first speed Vr1 before the ink ejection section; thereafter, when the acceleration has been completed, the carriage 41 is moved at the first speed Vr1 until the carriage 41 reaches the end point of the ink ejection section; then, the carriage 41 is re-accelerated so that the moving speed of the carriage 41 reaches the third speed Vr3; thereafter, the carriage 41 is moved at the third speed Vr3 until the carriage 41 reaches the deceleration start point; the carriage 41 is decelerated from the deceleration start point toward the target stop position; and the carriage 41 is stopped at the target stop position. Then, the processor 11 sets the generated speed profile to the CR motor controller 31.

When the processor 11 determines that the target profile type selected in the profile selecting process is not of the first type (S320: NO), but of the second type (S340: YES), the processor 11 executes the process in S350.

In S350, the processor 11 generates a speed profile defining the target speed Vr such that: the carriage 41 is accelerated so that the moving speed of the carriage 41 reaches the first speed Vr1 before the ink ejection section; thereafter, when the acceleration has been completed, the carriage 41 is moved at the first speed Vr1 until the carriage 41 reaches the end point of the ink ejection section; then, the carriage 41 is re-accelerated so that the moving speed of the carriage 41 reaches the third speed Vr2 which is slower than the third speed Vr3; thereafter, the carriage 41 is moved at the third speed Vr2 until the carriage 41 reaches the deceleration start point; the carriage 41 is decelerated from the deceleration start point toward the target stop position; and the carriage 41 is stopped at the target stop position. Then, the generated speed profile is set to the CR motor controller 31.

When the processor 11 determines that the target profile type selected in the profile selecting process is not of the second type, but of the second type (S340: NO), the processor 11 executes the process in S360.

In S360, the processor 11 generates a speed profile defining the target speed Vr such that: the carriage 41 is accelerated so that the moving speed of the carriage 41 reaches the first speed Vr1 before the ink ejection section; thereafter, when the acceleration has been completed, the carriage 41 is moved at the first speed Vr1 until the carriage 41 passes the end point of the ink ejection section and reaches the deceleration start point; the carriage 41 is decelerated from the deceleration start point toward the target stop position; and the carriage 41 is stopped at the target stop position. Then, the generated speed profile is set to the CR motor controller 31.

After setting of the speed profile has been completed (S240), the processor 111 executes the printing in the main scanning direction (S250). In S250, the processor 11 instructs the CR motor controller 31 to control the CR motor 51 in accordance with the speed profile set in S240.

Next, the processor 11 input the image data representing an image for one pass to be formed on the sheet P into the recording controller 21, and instructs the recording controller 21 to control the ejection operation of the ink droplets of the recording head 22 based on the image data. The image for one pass to be formed on the sheet P is an image to be formed on the sheet P by the ejecting operation of the ink droplets when the carriage 41 is moved from the turnaround position to the other turnaround position in the main scanning direction.

By the instruction described above, the CR motor controller 31 controls the CR motor 51 such that the carriage 41 moves in a speed trajectory following the speed profile set above, from the movement start position to the next turnaround position corresponding to the target stop position.

Concretely, the CR motor controller 31 executes the feedback control of the speed of the carriage 41 based on the speed profile. For example, the CR motor controller 31 calculates a deviation E between the target speed Vr according to the speed profile and the speed V of the carriage 41 measured based on the encoder signal (i.e., $E=Vr-V$).

The CR motor controller 31 calculates a voltage instruction value corresponding to a driving voltage to be applied to the CR motor 5 as an operation amount U of the CR motor 51 by inputting the deviation E into a particular transfer function, and inputs a control signal corresponding to the calculated value into the driving circuit 53.

The recording controller 21 controls the recording head 22 so that the ejection operation of the ink droplets to form the image corresponding to the image data is performed by the recording head 22 in accordance with the movement of the carriage 41. By execution of the main scanning direction printing in S250, the image for one pass based on the image data is formed on the sheet P.

After completing the main scanning direction printing in S250, the processor 11 determines whether the printing process for one page of the sheet P has been completed (S260). When it is determined that the printing process for one page has not been completed (S260: NO), the processor 11 causes the LF motor controller 35 to control the LF motor 71 so that the sheet P is conveyed forward, in the auxiliary scanning direction, by a particular amount corresponding to a width, in the auxiliary scanning direction, of one pass of the image (S270).

After execution of S270, the processor 11 sets the speed profile to be used in the next main scanning direction printing (S240). Since the profile selecting process (S120) is performed for each page, for the same page, the same type of speed profile is set.

After setting the speed profile, by executing the main scanning direction printing (S250), the processor 11 forms an image for one pass on the sheet P which has been conveyed forward by a particular amount in the auxiliary scanning direction in the previous process of S270.

The processor 11 keeps executing the process in S240-S270 repeatedly until it is determined that the printing process for one page of the sheet P has been completed. When it is determined that the printing of the one page of the sheet P has been completed (S260: YES), the processor 11 executed a process in S280.

In S280, the processor 11 executes a sheet discharging process to discharge the sheet P on which an image has been formed. In the sheet discharging process, the LF motor 71 is controlled through the ASIC 20, the sheet P on which the image has been printed is discharged onto a discharge sheet tray (not shown).

The processor 11 further determines whether the currently processed print job includes image data for the next page (S290). When it is determined that the currently processed print job has image data for the next page (S290: YES), the processor 11 returns the process to S210 and executes the profile selecting process for the next page (S210) and the page printing process (S220-S280).

In this way, the processor 11 sets the target profile type for each page, control the movement of the carriage 41 based on the same type of the speed profile for the main scanning direction printing in the same page, and form an image on each page of the sheet P. When the page printing processes for all the pages have been completed (S290: NO), the processor 11 terminates the printing process.

Next, the profile type selecting process the processor 11 executed in S210 will be described with reference to FIG. 7. When the profile type selecting process is started, the processor 11 estimate a maximum temperature Tx of the CR motor 51 (S410) when the page printing process to form a page image based on the page image data subjected to be processed using the first type of the speed profile (see FIG. 5A) would be executed.

Next, the processor 11 determines whether the estimated maximum temperature Tx is less than the protection temperature of the CR motor 51 having been determined in advance (S420). When it is determined that the estimated maximum temperature Tx is less than the protection temperature (S420: YES), the processor 11 selects the first type of the speed profile as the target profile type (S430).

When it is determined that the estimated maximum temperature Tx is not less than the protection temperature (S420: NO), the processor 11 estimates the maximum temperature Tx of the CR motor 51 when the page printing process to form the image based on the currently processed page image data would be executed using the second type of the speed profile (S440).

Thereafter, the processor 11 determines whether the estimated maximum temperature Tx is less than the protection temperature (S450). When it is determined that the estimated maximum temperature Tx is less than the protection temperature (S450: YES), the processor 11 select the second type of the speed profile as the target profile type (S460).

When it is determined that the estimated maximum temperature Tx is not less than the protection temperature (S450: NO), the processor 11 selects the third type of the speed profile as the target profile type) (S470). Thereafter, the processor 11 terminates the profile selecting process.

Figure 8:
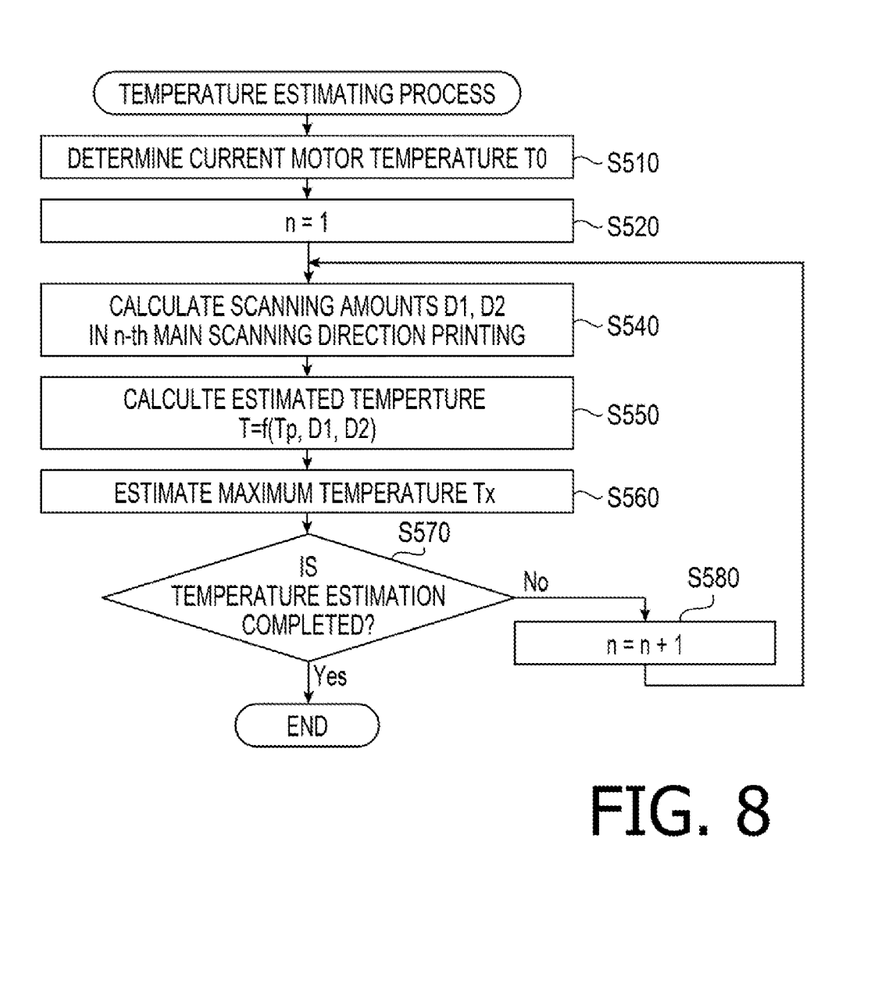
FIG. 8 is a flowchart illustrating a temperature estimating process.

Regarding estimation of the maximum temperature Tx in S410 and S420, by executing the temperature estimating process shown in FIG. 8, the processor 11 can estimate the maximum temperature Tx when the CR motor 51 would be driven using the target profile type corresponding to the estimation. According to the present embodiment, the target profile type is the first type (see FIG. 5A) when the maximum temperature Tx is estimated in S410, and the target profile type is the second type (see FIG. 5B) when the maximum temperature Tx is estimated in S440.

When the temperature estimating process is started, the processor 11 determines the current temperature TO of the CR motor 51 based on temperature information obtained from the temperature sensor 81 through the ASIC 20 (S510).

When the temperature sensor 81 is located away from the CR motor 51, deviation may exist between the temperature detected by the temperature sensor 81 and the actual temperature of the CR motor 51. In such a case, the processor 11 may determine the temperature obtained from the temperature sensor 81 to detect the current temperature TO of the CR motor 51.

Alternatively, the processor 11 may not use the temperature sensor 81. That is, the processor 11 may calculate the current temperature TO by physical calculations based on an amount of generated heat and an amount of radiated heat of the CR motor 51 under an assumption that the temperature of the CR motor 51 drops down to a room temperature and is stabilized when the CR motor 51 is in a paused state.

After determining the current temperature TO of the CR motor 51, the processor initializes a count number n to an initial value of 1. Thereafter, the processor 11 calculates a first scanning amount D1, which is a scanning amount of a first section, and a second scanning amount D2, which is the scanning amount of a second section, at the time of execution of printing in an n-th main scanning direction when the page printing process is executed using the speed profile of the target profile type (S540). The first scanning amount D1 and the second scanning amount D2 are moving amounts of the carriage 41 in the first section and the second section, respectively, or the driving time periods of the CR motor 51 when the carriage 41 moves in the first section and the second section, respectively.

The first section is a section from the movement start position, that is, a starting point of the acceleration section, through the constant speed section, to an intermediate point of the re-acceleration section. The second section is a section from the intermediate point of the re-acceleration section to the target stop position, through the remaining section of the re-acceleration section, the high-speed section and the deceleration section.

In S540, the processor 11 tentatively generates a speed profile according to a method similar to the method employed in the speed profile setting process shown in FIG. 6, and calculates the first scanning amount D1 and the second scanning amount D2 when the movement of the carriage 41 is controlled in accordance with the speed profile.

Thereafter, with use of a temperature estimation function $f(Tp, D1, D2)$ of the corresponding profile type, the processor 11 calculates the estimated temperature $T=f(Tp, D1, D2)$ of the CR motor 51 when the n-th main scanning direction printing is performed and completed (S550).

The temperature estimation function $f(Tp, D1, D2)$ includes the first scanning amount D1, the second scanning amount D2 in the n-th main scanning direction printing, and the estimated temperature Tp of the CR motor 51 when the (n−1)-th main scanning direction printing was completed as input variables. It is noted that the estimated temperature Tp of the CR motor when the (n−1)-th main scanning direction printing is completed when n=1 is the current temperature TO determined in S510.

According to a simple example, the temperature estimation function $f(Tp, D1, D2)$ is given by an equation $f(Tp, D1, D2)=Tp+K1+K2\times(D2/D1)$. The values K1 and K2 are particular fixed values, and the value K2 depends on the type of speed profile. It is noted, however, the value K1 may be a value proportional to the scanning amount from the turnaround point to the other turnaround point (D1+D2). The value K1 is the temperature rise of the CR motor 51 when the carriage 41 is moved from the turnaround point to the turnaround point without a high-speed section according to the third type of speed profile. The value K2 is the temperature rise of the CR motor 51 when the carriage 41 is moved, in accordance with the third type pf the speed profile, from the turnaround point to the other turnaround point without the high-speed section.

According to another example, the temperature estimation function f(Tp, D1, D2) is given by an equation f(Tp, D1, D2)=Tp+K 1+K2×[(V2×D2)/(V1×D1)]. The first scanning amount D1 here is a moving amount of the carriage 41 in the first section, and the second scanning amount D2 is a moving amount of the carriage 41 in the second section. V1 is an average moving speed of the carriage 41 in the first section, and V2 is the average moving speed of the carriage 41 in the second section. In other words, [(V2×D2)/(V1×D1)] corresponds to a ratio of the product of the speed and the moving amount in each section.

According to a further example, in S550, the estimated temperature T of the CR motor 51 when the n-th main scanning direction printing is completed may be calculated according to the temperature estimation formula expressed in following equation (1), which includes a moving distance S1 of the carriage 41 and the driving time t1 of the CR motor 51 in the first section as the first scanning amount D1, and a moving distance S2 of the carriage 41 and the driving time t2 of the CR motor 51 in the second section as the second scanning amount D2.

$$T = Tp * \left\{1 - \frac{k}{C} * t\right\} + \frac{1}{C} * t1 * \left\{\frac{E1*(E1 - a*V1)}{R} + k*Te\right\} + \frac{1}{C} * t2 * \left\{\frac{E2*(E2 - a*V2)}{R} + k*Te\right\} - \frac{F1}{C} * S1 - \frac{F2}{C} * S2 \quad \text{Equation (1)}$$

In the equation (1) above, "t" is an elapsed time since the (n−1)-th main scanning direction printing has been completed, "C" is specific heat, and "k" is thermal conductivity. For i=1 or i=2, "Ei" represents an average driving voltage of the CR motor 51 when the carriage 41 is located in an i-th section, "Vi" represents an average speed of the carriage 41 in the i-th section, and "Fi" represents a sliding friction in the i-th section. Further, "Te" represents an environment temperature, "R" represents a resistance of the motor, and "a" represents a torque multiplier. The environmental temperature Te can be identified based on the input from a thermistor (not shown) measuring an ink temperature.

The equation (1) contains a temperature drop term due to heat radiation after drive of the CR motor 51 is stopped, a temperature rise term due to heat generated by the drive of the CR motor 51, and a temperature drop term due to heat loss caused by the sliding resistance.

Thereafter, the processor 11 regards the maximum value of estimated temperatures at the ends of the first to n-th printings in the main scanning direction as the maximum temperature Tx of the CR motor 51 when the page printing process according to the target profile type is being performed (S560).

After completing the process in S560, the processor 11 determines whether the temperature estimation for an entire page has been completed (S570). In other words, the processor 11 determines whether the processes of S540-S560 for the entire page has been completed.

When it is determined that the temperature estimation for the one entire page has not been completed (S570: NO), the processor 11 increments the count value n by one (S580), calculates the estimated temperature T when the next main scanning direction printing is finished (S540, S550), and further estimates the maximum temperature Tx (S560).

When it is determined that the temperature estimation for the one entire page has been completed (S570: YES), the processor 11 terminates the temperature estimating process. In the temperature estimating process, the processor 11 estimates the maximum temperature Tx of the CR motor 51 if it is assumed that the page printing process for the entire page using the target profile type is completed.

Figure 9:
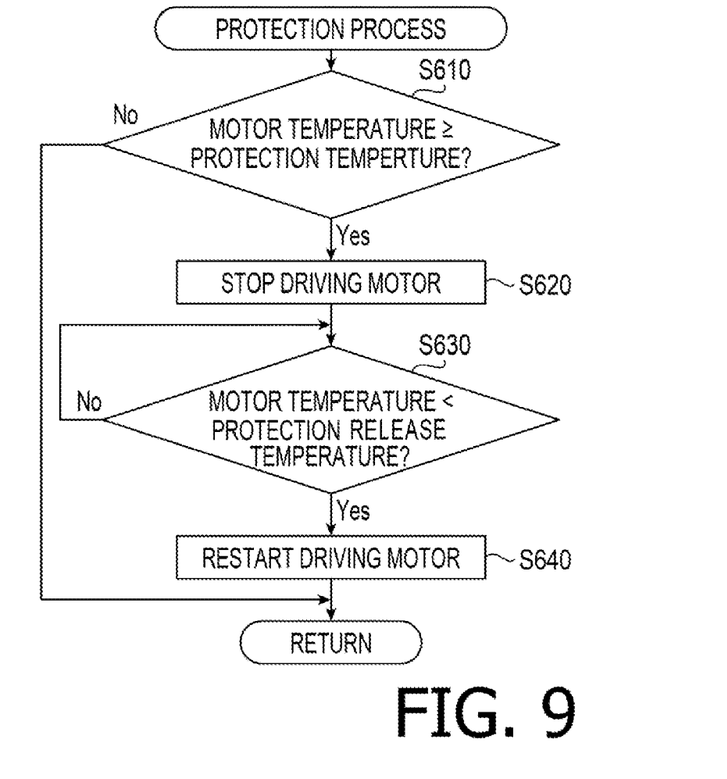
FIG. 9 is a flowchart illustrating a protection process.

In addition to this, the processor 11 repeatedly executes a protection process shown in FIG. 9 while the CR motor 51 is being driven. In the protection process, the processor 11 determines whether the current temperature of the CR motor 51 is equal to or higher than the protection temperature (S610). The processor 11 can determine the temperature of the CR motor 51 based on the temperature information from the temperature sensor 81 obtained through the ASIC 20.

When the processor 11 determines that the temperature of the CR motor 51 is equal to or higher than the protection temperature (S610: YES), the processor 11 instructs the CR motor controller 31 to temporarily stop the CR motor 51 (S620).

After instructing to temporarily stop the CR motor 51, the processor 11 pauses until the temperature of the CR motor 51 drops below a protection release temperature, which is a temperature defined, in advance, as lower than the protection temperature (S630). When the processor 11 determines that the temperature of the CR motor 51 has dropped below the protection release temperature (S630: YES), the processor 11 instructs the CR motor controller 31 so that the temporarily paused CR motor 51 is driven again (S640).

According to the image forming system 1 of the present embodiment described above, the processor 11 obtains temperature information on the temperature of the CR motor 51 (S510), selects one of the multiple types of speed profiles that define the control mode for the speed as the target profile type based on the temperature information (S430, S460, S470), and control the CR motor 51 using the speed profile according to the target profile type, thereby making the carriage 41 reciprocate.

The multiple types of speed profiles above are the profiles of which target acceleration and deceleration movements when the carriage 41 starts moving until stops at the turnaround position, in particular, the target speeds in the non-ink ejection section are different from each other. Due to differences in the target speeds, the moving time of the carriage 41 from the movement start position to the turnaround point and the amount of heat generated by the CR motor 51 differ among the multiple types of speed profiles.

For each execution of the page printing in one print job, the processor 11 detects the current temperature of the CR motor 51 prior to execution of the corresponding page printing, and, based on the detection results, estimates the maximum temperature Tx of the CR motor 51 if the page printing process is executed using respective types of speed profiles (S510).

Then, the processor 11 determines a type of the speed profile according to which the movement time of the carriage 41 is the shortest and a throughput regarding the page printing is the best as the target profile type to be applied to the page printing process (S210).

In this way, the processor 11 can execute the page printing process using the speed profile realizing the best throughput within a range where the CR motor 51 is estimated not to temporarily stop due to the temperature of the CR motor 51 being equal to or higher than the protection temperature during the printing operation for one page of the sheet P.

Therefore, according to the present embodiment, when a page image is printed, it is possible to suppress change of drying time of the ink droplets at various locations on the sheet P, thereby causing an unevenness of the image quality within a page of the sheet P as the CR motor 51 is paused by the protection process, and thereby the drive of the carriage 41 and ejection of the ink droplets being paused. As a result, according to the present embodiment, the image forming system 1 with high image quality and good throughput can be provided.

In particular, when the ink droplets are ejected multiple times onto the same area of the sheet P by the interlace control and an image is formed by the overlapped ink droplets, if an operation is paused in the overlapping process, the drying period of the ink ejected onto the sheet P first is elongated. In such a case, compared to the case where the operation is not paused, a visible change in the quality of the image formed on the sheet P occurs. According to the present embodiment, such an unevenness of the image quality due to the pause can be suppressed.

It is noted that the present disclosures are not necessarily limited to the above-described embodiment, but various modifications can be realized within aspects of the present disclosures. For example, the profile type selecting process shown in FIG. 7 may be performed for a process unit other than a page unit, for example, for a print job.

In other words, the processor 11 may be configured not to execute the profile selecting process (S210) for each page in the printing process (see FIG. 4). The processor 11 may be configured to execute the profile type selecting process for each print job, before execution of the corresponding printing process, by repeatedly executing a job-related process shown in FIG. 10 instead of the job-related process shown in FIG. 2B.

Figure 10:
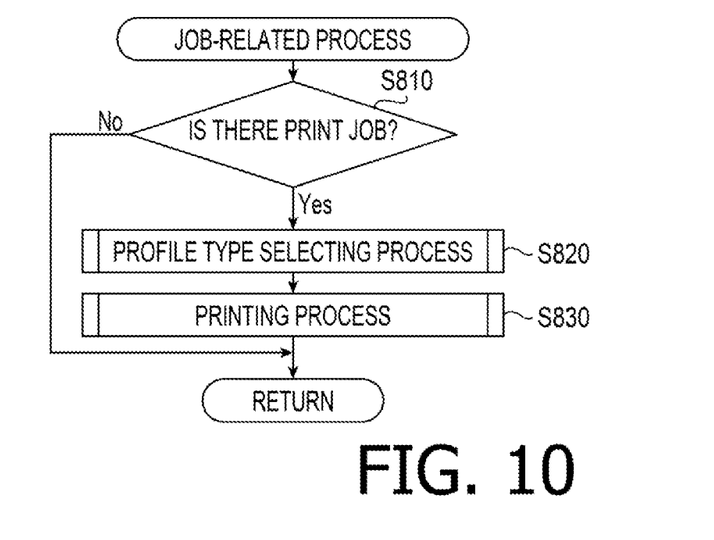
FIG. 10 is a flowchart illustrating a job-related process according to a modification.

According a modified job-related process shown in FIG. 10, when unprocessed print jobs are registered in the queue (S810: YES), the processor 11 selects one of the unprocessed print jobs as a target job and executes the printing process corresponding to the selected print job (S830). In such a case, prior to the printing process, the processor 11 execute a profile type selecting process (S820).

In the profile type selecting process executed in S820, as indicated in parentheses in FIG. 7, the processor 11 estimates the maximum temperature Tx of the CR motor 51 (S410) if the printing job corresponding to the target print job would be performed using the first type speed profile (FIG. 5A). When the estimated maximum temperature Tx is less than the protection temperature (S420: YES), the processor 11 selects the first type as the target profile type (S430). It is noted that the target profile type here is the type of the speed profile to be used for controlling the speed of the carriage 41 in the printing process (S220-S290) for the entire target print job.

When it is determined that the estimated maximum temperature Tx is equal to or larger than the protection temperature (S440: NO), the processor 11 estimates the maximum temperature Tx of the CR motor 51 (S440) if the printing job corresponding to the target print job would be performed using the second type speed profile (FIG. 5B). When the estimated maximum temperature Tx is less than the protection temperature (S450: YES), the processor 11 selects the second type as the target profile type (S460).

When it is determined that the estimated maximum temperature Tx is equal to or higher than the protection temperature in S420 and S450 (S420: YES; S450: YES), the processor select the third type as the target profile type for the entire target print job (S470).

According to the modification described above, for each print job, the target profile type is selected based on the maximum temperature Tx of the CR motor which is the estimated temperature if the print job would be performed. Therefore, a situation where the temperature of the CR motor 51 becomes equal to or higher than the protection temperature from the start to end of the printing job and the CR motor 51 is temporarily stopped or the like can be suppressed. Therefore, occurrence of unevenness of the image quality can be suppressed for an entire multi-page document subjected to the printing process in the print job. Therefore, it is possible to provide an image forming system with high image quality and good throughput.

According to another modification, the processor 11 may estimate the maximum temperature of the CR motor 51 for each pass, i.e., for each execution of the main scanning direction printing, prior to the execution and until the end of the main scanning direction printing. Then, the processor 11 may operate to select the target profile type as the one with the shortest moving time to the target stop position among the types of speed profiles of which estimated maximum temperature is less than the protection temperature.

In the profile type selecting process, using a reference temperature set to a lower temperature than the protection temperature instead of the protection temperature, the target profile type may be selected based on the comparison of the estimated maximum temperature Tx and the reference temperature. Based on this reference temperature, the target profile type is selected to further reduce the possibility of the CR motor 51 exceeding the protection temperature and causing the CR motor 51 to temporarily stop.

The technology according to aspects of the present disclosures is applicable not only to inkjet printers but also to control systems for other serial printers, garment printers, and the like. The technology according to aspects of the present disclosures is also applicable to control systems for industrial machines that dispense chemicals onto an object and process the object by the reaction between the object and the chemicals.

A function possessed by one component in the above embodiment may be distributed among multiple components. Multiple components realizing a single function may be integrated into a single component. A controller does not have to be composed of the processor 11 and the ASIC 20. That is, the controller may not be composed of the processor 11 and the ASIC 20, but may be composed of one or more processors without an ASIC, or may be composed of one or more ASICs without a processor. The controller does not have to consist of the processor 11 and the ASIC 20. The controller may include one or more processors without an ASIC, one or more ASICs without a processor, or a combination of one or more processors and one or more ASICs. The one or more components of the controller, including at least one of the processor and the ASIC, may cooperate with each other to perform processing pertaining to the controller of the present disclosure.

In addition, some of the configurations of the above-described embodiments may be omitted. Any configuration included in the technical concept identified from the wording of the claims is an embodiment of the present disclosures.

What is claimed is:
1. A control system, comprising:
   a motor;
   a carriage configured to be driven by the motor to reciprocate;

a processing head mounted on the carriage and configured to eject liquid droplets to a target object when the carriage moves along a moving passage of the carriage; and a controller configured to control the motor using a selected one of a plurality of control modes, each control mode having a different speed profile, each speed profile defining movements between a time when the carriage starts moving to a time when the carriage stops at a turnaround point of reciprocating movement of the carriage, wherein the controller is configured to perform:
obtaining temperature information related to a temperature of the motor;
selecting a candidate control mode;
predicting, for the candidate control mode, prior to driving the motor based on the candidate control mode, a maximum temperature of the motor in a case where the motor is driven by the controller using the candidate control mode and data for a work unit, for the entire work unit until processing of the work unit is completed;
determining whether the predicted maximum temperature is less than a reference temperature;
selecting the candidate control mode, as a target control mode when it is determined that the maximum temperature for the candidate control mode is less than the reference temperature; and
causing the carriage to reciprocate by controlling the motor in accordance with the target control mode.

2. The control system according to claim 1,
wherein the controller is configured to perform, as a job, every time when an execution instruction of the job is input:
reciprocating the carriage by controlling the motor in the target control mode; and
controlling the processing head so that a processing corresponding to the job is performed to the target object,
wherein the selecting of the target control mode includes, for every execution of the job as the work unit, selecting the target control mode to be applied to control of the motor in the corresponding job, wherein the maximum temperature is predicted for the job as the work unit until the corresponding job is completed.

3. The control system according to claim 2,
wherein the processing includes forming an image on the target object,
wherein the job includes, for each of multiple sheets each serving as the target object and supplied to the moving passage one by one;
reciprocating the carriage by controlling the motor in the target control mode; and
controlling the processing head so that an instructed image is formed on a corresponding sheet of multiple sheets, and
wherein, regarding multiple jobs associated with formation of images on the multiple sheets, the target control mode is selected at execution of each of the multiple jobs as multiple separate work units, respectively.

4. The control system according to claim 1,
wherein the processing includes forming a corresponding image on each of multiple sheets, which are target objects supplied one by one to the moving passage;
wherein the controller is configured to perform, for each of the sheets supplied to the moving passage, image formation including:
reciprocating the carriage by controlling the motor in the target control mode; and
controlling the processing head so that, on each of the sheet supplied to the moving passage, a corresponding image is formed,
wherein the multiple sheets are a single work unit.

5. The control system according to claim 1,
wherein a first selected candidate control mode has a highest maximum speed from among the plurality of control modes.

6. The control system according to claim 1,
wherein for each iteration in the selection of the candidate control mode, a highest maximum speed of the candidate control mode decreases.

7. The control system according to claim 6,
wherein each of the speed profiles defines target speeds of the carriage in an acceleration section where the carriage is accelerated from a movement start position to a constant speed state, a deceleration section where the carriage is decelerated from the constant speed state to stop at a target stop position corresponding to the turnaround point, and an intermediate section between the acceleration section and deceleration section, and
wherein the target speed of the carriage in the intermediate section is different between the plurality of control modes and wherein the highest maximum speed occurs in the intermediate section for at least two of the plurality of control modes.

8. The control system according to claim 7,
wherein the plurality of control modes include:
a first control mode in which the motor is controlled according to a first speed profile that defines the target speed of the carriage so that the carriage moves at a constant speed at the first speed in the intermediate section; and
a second control mode in which the motor is controlled according to a second speed profile that defines the target speed of the carriage so that the carriage moves at the constant speed at the first speed in a first range in the intermediate section and at a constant speed at a second speed higher than the first speed in a second range in the intermediate section.

9. The control system according to claim 8,
wherein the plurality of control modes include:
a third control mode in which the motor is controlled according to a third speed profile that defines the target speed of the carriage so that in the first range, the carriage moves at the constant speed at the first speed, and in the second range, the carriage moves at a constant speed at a third speed higher than the second speed.

10. The control system according to claim 8,
wherein the first range is a range where processing is performed to the target object, and the second range is a range where no processing is performed to the target object.

11. The control system according to claim 1,
wherein the controller controls the motor to temporarily stop the motor when the temperature of the motor is equal to or higher than a protection temperature, and
wherein the reference temperature is defined as a temperature below the protection temperature.

12. The control system according to claim 9, wherein a first candidate control mode is the third control mode.

13. The control system according to claim 1, further comprising a temperature sensor configured to sense the temperature of the motor prior to the motor being driven for the work unit.

14. The control system according to claim 1, wherein the processing includes forming a corresponding image on a sheet in lines, and the work unit is a line of the sheet, wherein the selection of the target control mode being performed per line.

15. The control system according to claim 1, wherein, when the predicted maximum temperature is greater than or equal to the reference temperature, the controller is further configured to select another control mode of the plurality of control modes as the candidate control mode and repeated the predicting of the maximum temperature of the motor, and the determining.

* * * * *